Nov. 18, 1958   W. A. BLACK   2,860,481
SECONDARY CLOCK RESETTING MEANS
Filed March 28, 1957   6 Sheets-Sheet 2

INVENTOR
WILLIAM A. BLACK, DECEASED
MARION BENNETT BLACK, EXECUTRIX

ATTY.

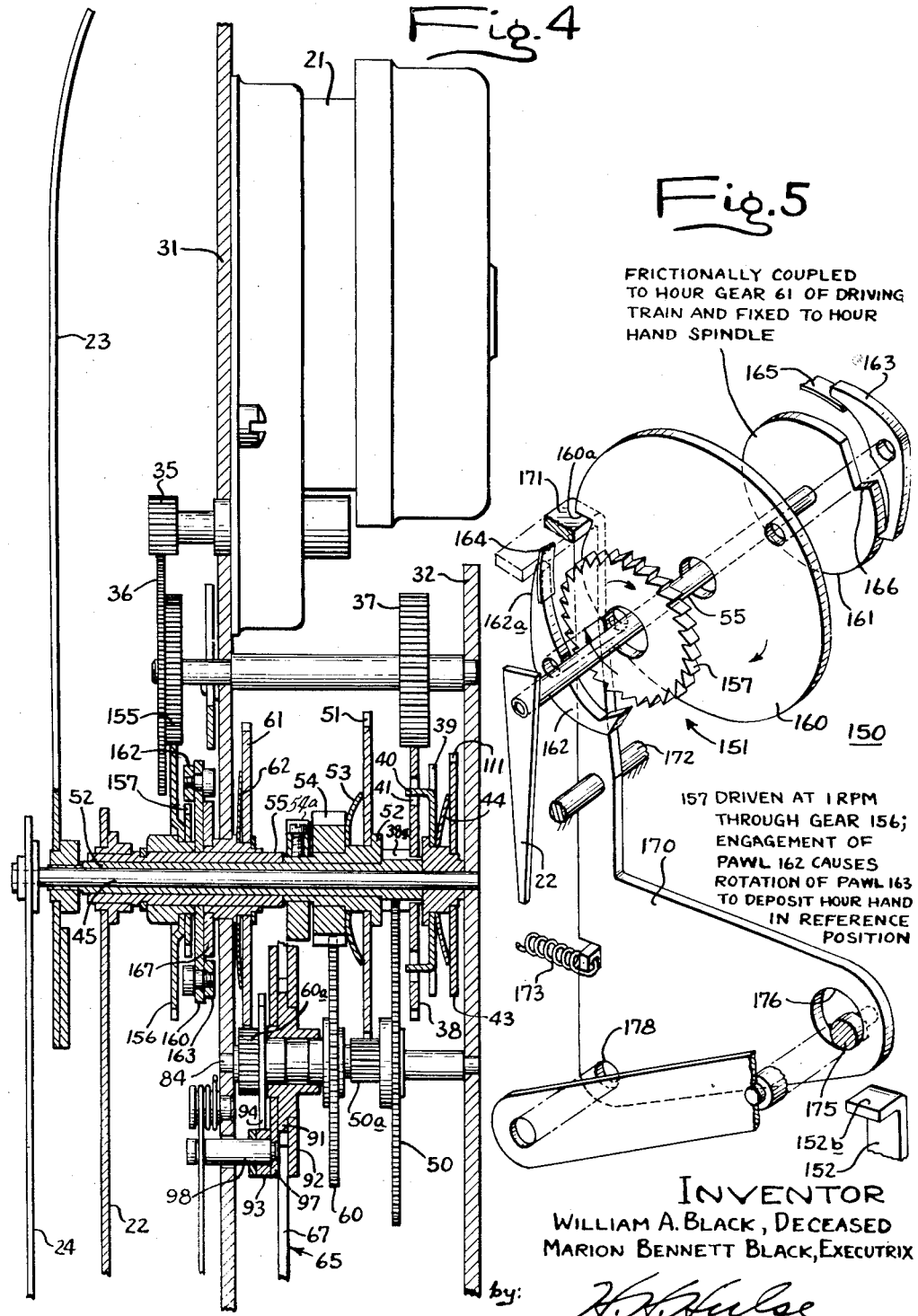

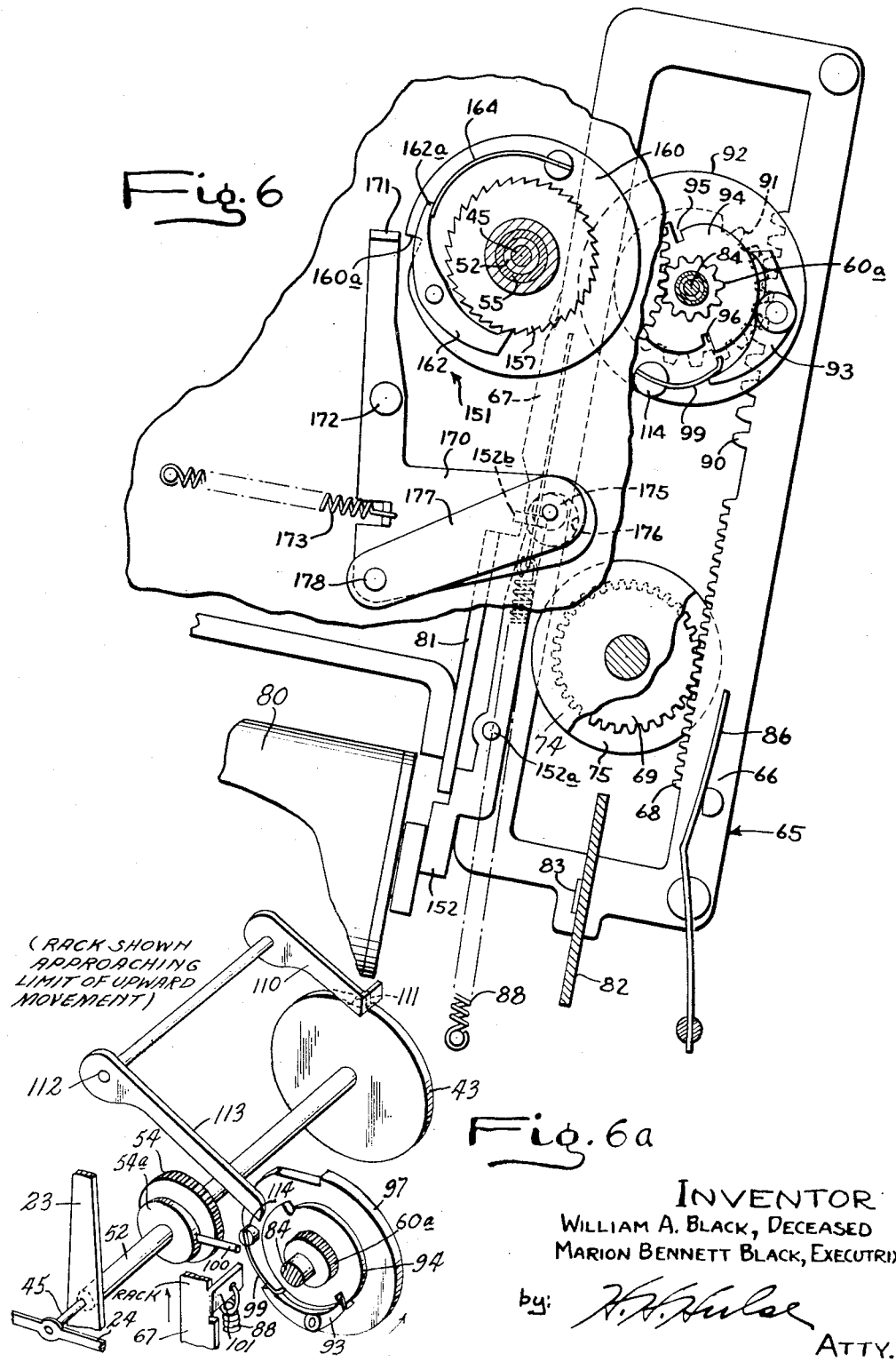

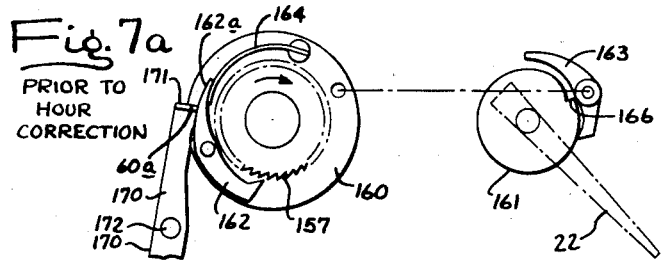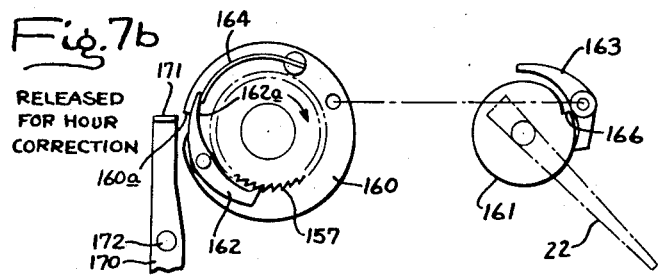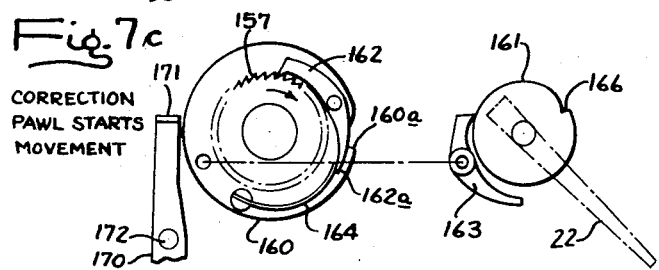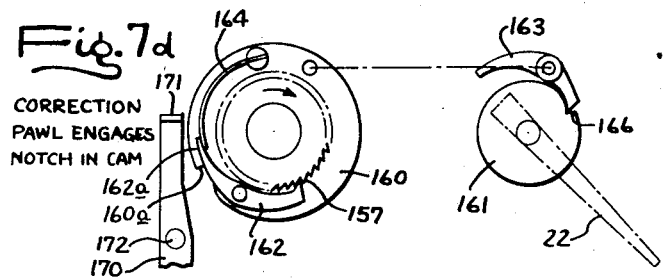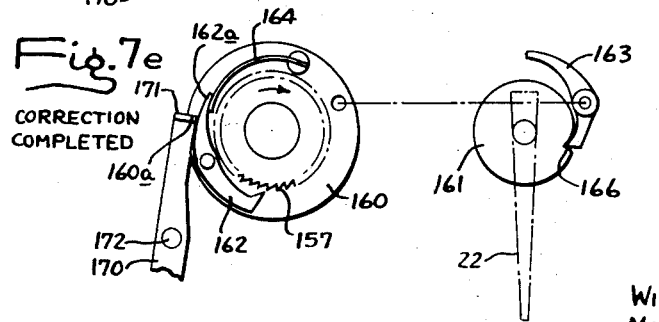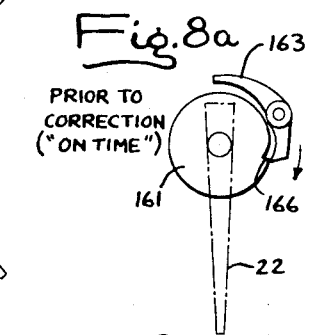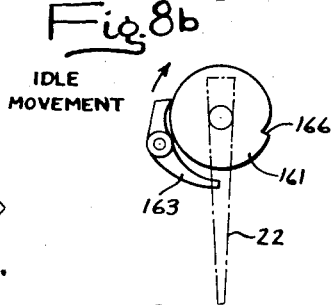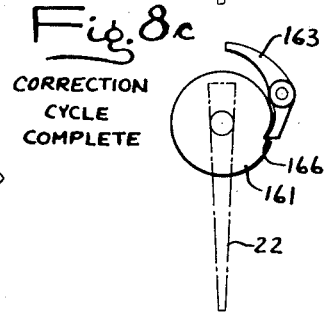

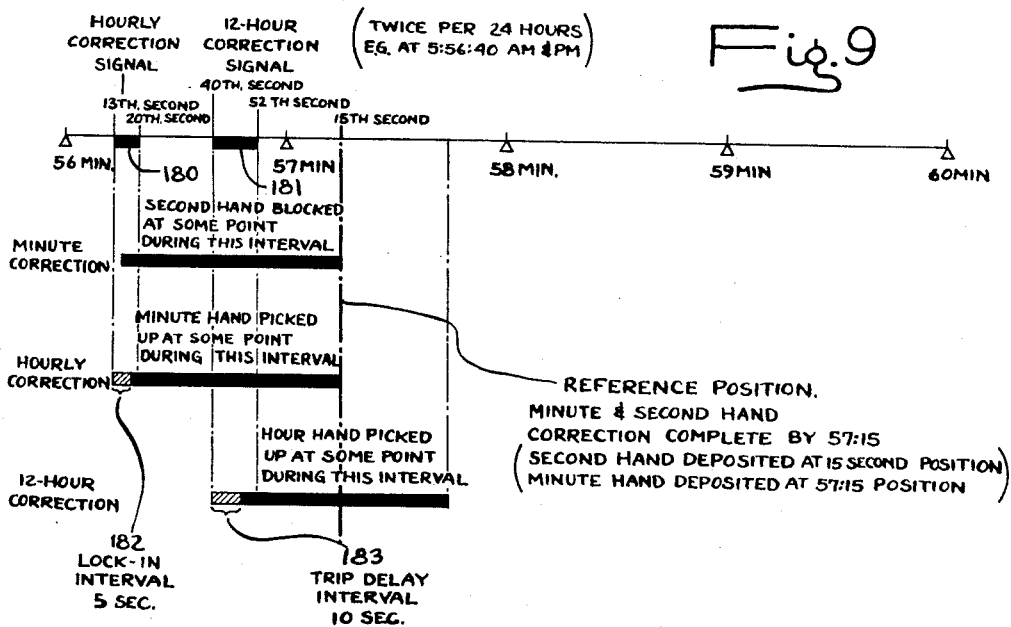
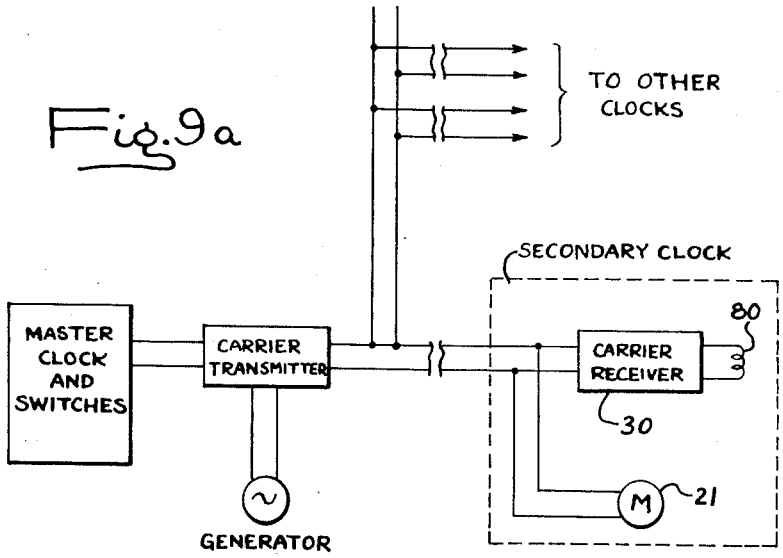

United States Patent Office 2,860,481
Patented Nov. 18, 1958

2,860,481

SECONDARY CLOCK RESETTING MEANS

William A. Black, deceased, late of Montclair, N. J., by Marion Bennett Black, executrix, Montclair, N. J., assignor to General Time Corporation, New York, N. Y., a corporation of Delaware Application March 28, 1957, Serial No. 649,027

14 Claims. (Cl. 58—34)

The present invention relates to an improvement in secondary clock resetting means of the type disclosed in my prior Patent No. 2,796,729 which issued on June 25, 1957.

In such secondary clocks the minute and second hands are periodically reset to a correct reference as may be necessary in the event that the clock power source, conventionally a 60-cycle alternating power supply, has been interrupted or subject to frequency deviations in the period between resetting cycles. In the clock previously disclosed a resetting signal of predetermined duration from a primary clock initiates an hourly resetting cycle, the clock power source serving to move the minute and second hands to reference positions. It is characteristic of the above mechanism that the minute hand is restored to its proper position through an arc which is always less than 360° and which adequately takes care of corrections of less than one hour. However, the resetting of the minute hand leaves the hour hand in an incorrect position in the event of a sustained power failure in excess of an hour.

It is therefore the primary object of the invention to provide a novel self-resetting secondary clock which includes novel provision for setting the minute and second hands hourly and for setting the hour hand once during each 12-hour period in response to signals from a remote master clock, and regardless of the amount the clock may be out of time at the time of resetting.

It is another object to provide an improved 12-hour correction means which is reliable, which is proof against spurious signals and which places a minimum demand upon the control system, enabling such system to be used, in addition, for other remote control functions.

It is a further object of the invention to provide an hour hand resetting means in a clock of the type described which is simple and inexpensive. More specifically, it is an object to provide a 12-hour resetting means for a clock which is capable of being added as an auxiliary to a self-actuated minute and hourly resetting means. It is a related object to provide an hour hand resetting means which can be easily incorporated in the minute hand resetting means of a clock of the kind described either by way of modification or during initial construction.

Other objects and advantages of the invention will become apparent upon reading the attached description and upon reference to the drawings, in which:

Fig. 4 is a fragmentary transverse section of the clock and corrector mechanism taken alone the line 4—4 of Fig. 1.

Fig. 5 is a distorted perspective view showing the driving means employed in effecting 12-hour correction.

Fig. 6 is a view similar to Fig. 2 with the rack in the upwardly drawn position and with the electromagnet energized to initiate a 12-hour correction cycle.

Fig. 6a is a fragmentary view showing the positioning means for the second hand and the positioning means for the minute hand when the same is operating "fast."

Figure 1:
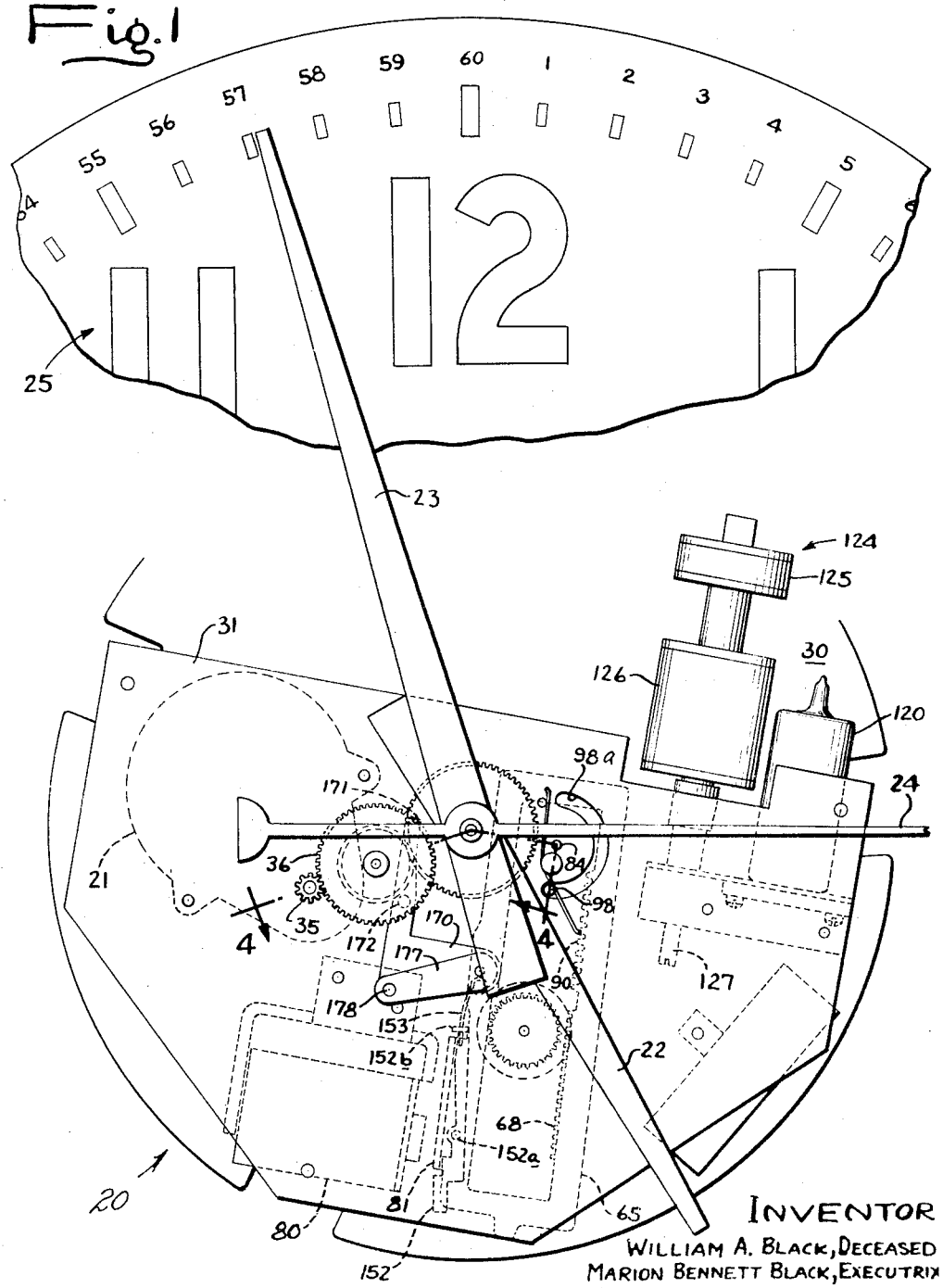
Fig. 1 is a front view of a secondary clock mechanism covering the present invention with portions broken away to show details of construction.

Figs. 7a–7e inclusive are a series of stop motion diagrams showing operation of the single revolution clutch and the movement of the hour hand which occurs during a typical correction cycle.

Figs. 8a–8c are a series of stop motion diagrams showing the idle motion of the mechanism when the hour hand is "on time."

Fig. 9 is a time scale showing the timing of the impulses required for hourly correction and 12-hour correction and the movement of the correction mechanism which results.

Fig. 9a is a schematic electrical diagram showing the relation of the initiating electromagnet to the remainder of the system.

While the invention has been described herein in connection with a preferred embodiment, it will be understood that I do not intend to limit the invention to such embodiment, but intend, on the contrary, to cover all modifications, alternative constructions, and equivalents, which may fall within the spirit and scope of the appended claims.

Turning now to the drawings, the clock mechanism indicated generally at 20 is driven by a synchronous motor 21. It has the usual hour, minute and second hands 22, 23 and 24, respectively, cooperating with a face 25. The clock further includes a tuned receiving device 30 for responding to regulating carrier signals which are impressed upon the supply line at a predetermined instant during each successive hour and at 12-hour intervals by a transmitter (not shown). The component parts are mounted on a frame having a front plate 31 and a rear frame plate 32, the plates being held in rigid box-like formation by suitable posts or spacers.

Prior to discussing the regulating means, it will be helpful to understand the normal driving train which interconnects the synchronous motor 21 and the clock hands, particular reference being made to Fig. 4. The motor 21 has a driving pinion 35 which may, for example, operate at a speed of 10 R. P. M. Rotary movement is transmitted through a pair of speed reduction gears 36, 37 to a second hand driving gear 38. Locked for rotation with the gear 38 is a drive disc 39, the disc and gear being coupled together in the present instance by means of axially extending tabs 40 on the disc which are received in registering holes 41 in the gear. Lying adjacent the drive disc 39 is a second hand disc 43, the two discs being frictionally engaged with one another by a bowed spring 44 interposed between them. The disc 43 is drivingly connected to a center shaft 45, which extends coaxially through the clock mechanism and which is connected at its front end to the second hand 24.

For the purpose of driving the minute hand, a compound reduction gear 50 is provided, which receives its power from a pinion 38a on the second hand gear 38. Coupled to a pinion 50a of the compound gear 50 is a minute hand driving gear 51. This gear is freely mounted at the end of a minute hand shaft 52 and is frictionally coupled to it by means of a bowed spring 53. The latter spring by reason of its friction rotates a minute hand pinion 54, which is fixed to the shaft 52.

The means for driving the hour hand 22, mounted on shaft 55 is also shown in Fig. 4 and includes a compound speed-reducing gear 60 having a pinion 60a which is engaged by an hour hand driving gear 61, the latter being connected frictionally by a bowed spring 62, to the hour hand shaft 55. As a result of the foregoing, the hour, minute and second hands are all driven at an appropriate speed by the synchronous motor 21 which is fed from the A.-C. line, the operation of the driving train thus far described being conventional.

Reference is made to my copending application, Serial No. 400,287, filed December 24, 1953, and assigned to the assignee of the present invention, for a fuller description of the mechanism for setting the minute and second hands, over which the present invention constitutes an improvement. A brief resume of the minute hand resetting means follows to facilitate understanding of the operation and utility of the over-all device and particularly the 12-hour correction as employed for a practical resetting sequence. First, however, mention may be made of the chronological times and hand positions used for reference. Fig. 9, which will be later discussed in greater detail, may be referred to in connection with the following.

The reference time choice for the hourly resetting of the minute hand, corresponding to the chronological time signal of the primary clock, is 57 minutes and 15 seconds after each hour. Other reference positions may be substituted without departing from the invention. As shown, the hourly transmitter signal is initiated at 56 minutes and 13 seconds. The minute hand resetting mechanism to be described requires a signal of given duration, in this case, 5 seconds, in order to initiate and lock in the resetting mechanism before proceeding under the secondary clock power to complete the resetting action. Consequently, the transmitter signal is 7 second duration, the two seconds additional being provided as a matter of precaution. The minute hand resetting mechanism completes its cycle in a little under a minute so that at 57 minutes and 15 seconds after the hour the minute hand has been advanced to its reference position. The resetting cycle is of constant duration whether the hand is "on time" or not, and if not, sometime during this interval the minute hand of the clock is picked up so that it must in any event be advanced to the final reference position at the end of the period.

Anticipating the discussion of the 12-hour correction, which occurs during only one of each 12 resetting cycles of the minute hand, a special 12-hour signal from the transmitter is provided at 56 minutes and 40 seconds after the "12th hour," which in the present embodiment is arbitrarily chosen as the 5th hour, both a. m. and p. m., i. e., practically 6 o'clock. This signal, for reasons to be explained in following paragraphs, has a duration of approximately 12 seconds. The auxiliary hour hand resetting mechanism is designed in this instance, by a lost motion connection to be described, to accomplish tripping of the mechanism approximately 10 seconds after the beginning of the 12 hour signal. It will be noted that the 12-hour signal occurs during the minute hand resetting cycle after the minute resetting mechanism has locked in and is underway. The 12-hour correction requires slightly less than one minute for correction. During this interval, the hour hand is picked up, wherever it may be on the clock face, and advanced to the selected "12th-hour" (6 o'clock) position.

Focusing attention now on the minute hand resetting mechanism, the driving motor 21 must be coupled to the minute hand 23 for accelerated advance of the hand to the reference position during the resetting cycle. This driving engagement is provided by a rack assembly which serves as a timed clutch. As shown in the drawings (see particularly Fig. 2), the rack assembly comprises a rack 65 in the form of an elongated rectangular frame suitably fabricated from sheet steel members. This frame is loosely mounted for both endwise (generally upward) movement as well as for bodily swinging in the region of its upper end. On one of the long sides 66 are gear teeth at the lower portion of the inwardly facing edge. These teeth define a rack 68. The rack is designed to engage a rack driving pinion 69 which is constantly driven from the motor by suitable gearing (not shown). Flanges 74, 75 on either side of the driving pinion extend beyond the inner edges of the rack 65 and at the upper end disc members 92, 97 on shaft 84 (and to be described) perform a similar function so that motion of the frame in its own plane is assured, whether or not the rack and pinion are engaged.

Upon receipt of the hourly resetting signal from the primary clock, an electromagnet 80 is energized through the receiver 30 for the duration of the signal. This magnet is suitably secured to the clock frame to one side of the rack and adjacent an armature 81 formed in the lower portion thereof. The attraction of the armature about the shaft 84 as a pivot causes the rack to occupy the position shown in Fig. 2.

Figure 2:
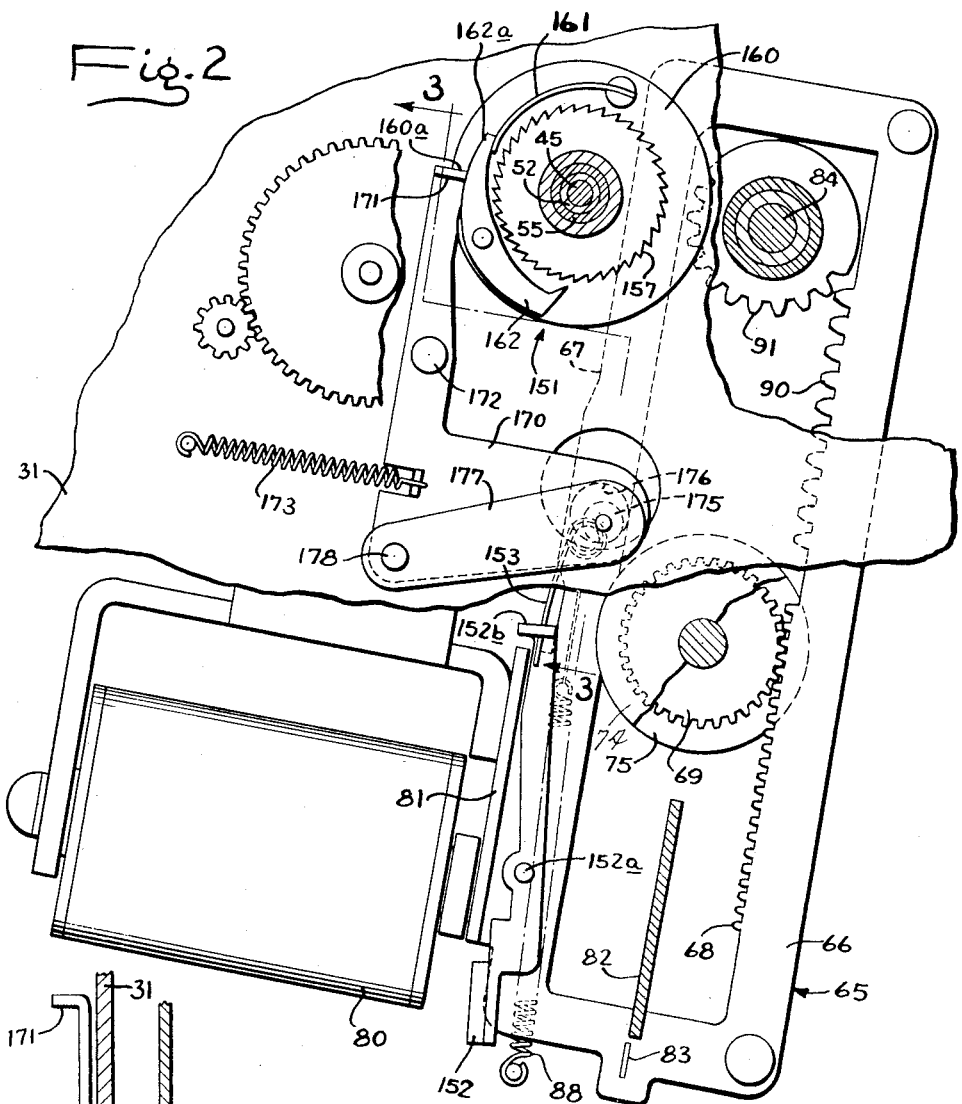
Fig. 2 is a fragmentary elevation in partial section of the rack mechanism which is used to effect both hourly and 12-hour correction.
Figure 3:
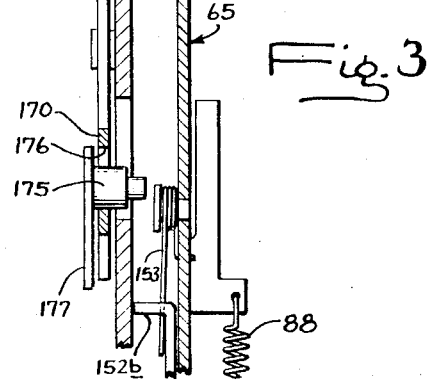
Fig. 3 is a fragmentary section taken along the line 3—3 of Fig. 2.

Means are provided for "locking in" the rack member so that the rack member completes its regulating cycle once such cycle has been initiated by a sustained signal. This is accomplished in the present instance by a rail 82 mounted on the frame, which rail is engaged by a post 83 at the lower end of the rack member. During normal driving of the clock, the rack member occupies a retracted position, with the rack and pinion connection disengaged, and with the rack member at the lowermost point of its range of movement. Upon energizing the electromagnet 80, the rack is swung clockwise about the pivot 84. Subsequent movement of the rack member 65 in a vertical direction causes the post 83 to ride upwardly along the inside surface of the rail 82 which is the surface nearest the electromagnet. The beginning of such movement is shown in Fig. 2. When the post 83 is opposite the inside surface of the rail 82 the rack member is held captive against the magnet 80, and the electromagnet may be de-energized without disengaging the rack and pinion drive connection. The clutch connection which is formed by the latter is thus locked in until the cycle is complete. The rack member 65 continues to be impelled upwardly by the drive pinion 69 until such time as the post 83 clears the top end of the rail 82, whereupon the rack member 65 is free under the influence of spring 86 to rotate out of engagement from the driving pinion. The return coil spring 88 then pulls the rack down to its initial position terminating a cycle of movement.

Means are further provided for forcibly positioning the minute hand 23, as a result of vertical movement of the rack member, so that it occupies a predetermined reference point at the end of the regulating cycle. To accomplish this, there is formed on the inside of the longitudinal rack portion 66 a rack 90 which drives a regulating gear 91 having an alining disc 92. The regulating gear which is utilized to pick up the minute hand when it runs slow, has teeth formed on only one half of its periphery, since it is required to make only half a revolution during its operating cycle. Since the amount that the minute hand may be slow is indeterminate, a take-up connection is interposed between the minute hand pinion 54 and the regulating gear 91. In the present instance such take-up connection is provided by a pawl 93 and cam 94, the pawl being operated by the regulating gear 91 and the cam being directly coupled to the minute hand pinion via the gear 60 referred to above. The gear 60 has a rotational speed which is one half of that of the minute hand pinion 54; therefore a two-cycle cam is used having first and second abutments 95, 96 diametrically spaced from one another. For the purpose of carrying the pawl bodily about the periphery of the cam 94, a regulating disc 97 is provided, the regulating disc being directly coupled to the regulating gear 91. The disc 97 is dimensioned to extend beyond the confines of the regulating gear so that, as stated, it cooperates with the disc 92 previously referred to in keeping the gear 91 and rack 90 alined with one another at all times. The pawl 93 is mounted on the regulating disc 97 by a pivot 98. The pawl 93 is spring-biased into engagement with the cam by means of a spring 99. The disc 97 is limited in its movement by providing an arcuate slot 98a in the adjacent frame plate, the pivot 98 being arranged to bottom in one end thereof (Fig. 1).

The pawl and cam arrangement discussed above provides means for bringing the minute hand from some "slow" position up to the reference position during the course of a regulating cycle. Means are further provided for positively defining the reference position and for moving the minute hand backwardly into such reference position when the minute hand is fast. In the present instance, this is accomplished (Fig. 6a) by providing a radially extending abutment 100 on a collar 52a on the minute hand shaft which is engaged by a rack abutment 101, so as to positively define the upper limit of movement of the rack member. The rail 82 previously referred to preferably includes provision for longitudinal adjustment so that the top end of the rail 82 is "cleared" at substantially the same time that the abutments 100, 101 come in contact with one another. This insures that the minute hand is positively positioned at the instant that the regulating cycle is terminated. Since the mechanism thus far described is capable of moving the minute hand forwardly and backwardly depending upon whether it is slow or fast, it may be referred to as a "centering" mechanism, the hand being centered on the desired reference point.

Reference is made to the copending application for a more detailed description of the structure and operation. It is apparent from what has already been said that operation of the rack, acting through the gears 60, 54 forcibly restores the minute hand to its 57:15 reference position, slippage taking place at the bowed spring 53 which provides the driving friction during normal running of the clock. Reference may also be made to the copending application for the details of the mechanism which causes the second hand to occupy a predetermined position at the end of the correction cycle, the 15-second position in the present embodiment. It will suffice to say, in connection with Fig. 6a hereof, that the zero position of the second hand is determined by a second hand stop lever 110 which engages a stop 111 formed on the periphery of the second hand disc 43. Normally, the stop lever occupies a raised position clear of the stop 111. For holding the lever in such raised position, an actuating lever 113 is provided which is normally supported by a stop or protuberance 114 on the face of the regulating disc 97. In operation, as the rack begins to rise, it causes counterclockwise rotation of the regulating disc 97, thereby dropping the stop mounted thereon and causing the stop lever to be dropped in the path of movement of the stop 111, which blocks the second hand at the reference 15-second position, with slippage taking place at the friction coupling formed by spring 44. At the end of the cycle the stop 111 is disengaged thereby freeing the second hand for timed rotation. The fact that the regulating cycle is more than a minute in length insures that the second hand will reach the reference 15-second position during the correction cycle.

In accordance with the present invention, novel correction means are provided for positioning the hour hand at a reference position in response to a subsequent signal received at said electromagnet at a predetermined time interval following receipt of the signal which positions the minute hand. In the present embodiment, this is accomplished by an hour hand positioning means indicated at 150 having a single cycle clutch 151, the operation of which is initiated by an auxiliary armature 152 mounted on the rack 65 and brought into the vicinity of the electromagnet during movement of the rack against the force of the return spring 153. As contemplated by the invention and as brought out more fully below, the arrangement is such as to operate the clutch for setting of the hour hand whenever a sustained signal is applied to the electromagnet which is timed with the arrival of the auxiliary armature. Prior to a discussion of the armature and connecting linkage, it would be helpful to have in mind the construction of the hour hand positioning means and its clutch, reference being made to Figs. 4 and 5. Power for accomplishing the setting movement is derived from a gear 155 which is fixed to the driving gear 36 which engages the motor pinion. Meshing with the gear 155 is a gear 156 concentric with the hour hand shaft 55. Fixed to the gear 156 is a ratchet wheel 157, the gear ratio being such as to cause the ratchet wheel to rotate constantly at a speed of 1 R. P. M.

For transmitting torque to the hour hand during the setting operation, a ratchet disc 160 and an hour hand correction cam 161 are provided, such cam being rigidly secured to the hour hand shaft 55. The ratchet disc 160 has two pawls 162 and 163 mounted on opposite sides of the disc at diametrically opposite points, and inwardly biased by means of springs 164 and 165 respectively. The pawl 163 normally rides idly on the periphery of the hour hand correction cam 161; however, a notch 166 is provided in the correction cam which is engaged by the pawl 163 during the correction cycle. Thus the hour hand is "picked up" by the pawl when it is out of time, moved around to its proper reference position, and deposited there at the end of the correction cycle.

In order to disable the correction means during normal running of the clock, an hour correction lever 170 is provided having an abutment or finger 171 at its upper end which may be formed simply by bending over the top portion as shown. The hour correction lever 170 is mounted for rocking about a central pivot 172 and is urged in a clockwise direction by a biasing spring 173.

Since the amount of correction required by the hour hand is always less than 360°, the ratchet disc which drives the hour hand correction cam has a novel provision for limiting the disc to a single cycle of rotation whenever the hour correction arm is temporarily rocked to a releasing position. This action is brought about by a notch 160a formed in the periphery of the ratchet disc 160 at a point which is alined with the tail portion 162a of the pawl 162. Thus when the finger 171 of the hour correction arm is seated in the notch 160a it presses on the tail of the pawl 162 thereby retaining it in a retracted position. Thus, as long as the hour correction arm occupies the normal position shown in Figs. 2 and 5, the correction mechanism is inoperative. And, following tripping the mechanism is restored to such condition after precisely one revolution.

In accordance with one of the aspects of the invention, a linkage including a lost motion connection is provided between the auxiliary armature 152 and the hour correction lever 170 so that the latter is moved into a releasing position upon the continued movement of the rack 65 which occurs during the time that the auxiliary armature 152 is held in by the magnet 80. In the present embodiment, the auxiliary armature 152 is pivoted to the rack 65 at a central pivot 152a and is provided at its upper end with an abutment 152b. Arranged in the path of movement of this abutment is a pin 175 which is coupled to the hour correction lever 170 through a lost motion connection. To provide the lost motion, the pin 175 is received in an oversized hole 176 in the lever and mounted at the end of an auxiliary link 177 which is pivoted to the hour correction lever at a pivot 178. Briefly stated, the arrangement is such that when the auxiliary armature 152 is actuated, i. e., "held in" for a predetermined length of time, say 12 seconds, during the course of movement of the rack member, the upper end of the armature engages the pin 175 which, after taking up lost motion, serves to rock the hour correction lever in a counterclockwise direction, thereby simultaneously freeing the ratchet disc and causing engagement between the driving pawl 162 and the constantly rotating ratchet wheel 157. This begins the correction cycle. Once the mechanism is tripped and once the cycle of revolution of the disc 160 is begun, the lever 170 may be released and the disc will continue to revolve through the full revolution required for correction. This being true, the initiating signal may be made quite short without sacrificing reliability, i. e., on the order of twelve seconds.

Prior to reviewing a typical hour hand correction cycle in detail, it will be helpful to refer to Fig. 9 which is a time chart showing the timed occurrence of the hourly correction signal, which results in the setting of the minute hand, and the 12-hour correction signal which results in the setting of the hour hand. It will be noted in Fig. 9 that the hourly correction signal is preferably a sustained signal which lasts from the 13th second to the 20th second in the 56th minute of every hour. The timing of this signal is controlled by an accurate time switch mechanism located at the transmitter which controls a number of secondary clocks of the type herein described, a typical system being shown in Fig. 9a. The specific transmitter does not form a part of the present invention and may take many forms apparent to those skilled in the art. The 12-hour correction signal is timed to occur approximately 27 seconds following the beginning of the first signal, i. e., timed with the arrival of the auxiliary armature 152 opposite the face of the magnet 80. More specifically, the 12-hour correction signal is timed to occur between the 40th and the 58th seconds of the 56th minute. In practicing the invention, the 12-hour correction signal occurs only once in a 12-hour period, for example at the 5th hour, 56th minute and 40th second, both a. m. and p. m. The ratchet disc 160 and the cam 161 are so phased as to cause the hour hand, as a result of the correction, to be deposited at the reference position of 6 o'clock. Obviously, any other hour within the 12-hour period could be selected as a reference point.

In order to understand the overall operation of the device, reference will next be made to the stop motion diagrams showing the operation of the hour hand setting mechanism during a typical cycle, the same being set forth in Figs. 7a–7e, inclusive. It will be assumed that the hour hand is out of time, being approximately 2 hours slow. Thus, immediately prior to an hour hand correction, the parts will occupy the relative positions shown in Fig. 7a, with the ratchet wheel engaged and the pawl 165 riding on the periphery of the cam 161.

It will further be assumed that the minute hand is out of time (slow) by approximately 15 minutes, cross reference being made to Figs. 7a–7d in the above-mentioned copending application. Finally, it will be assumed that the time is the 5th hour, the 56th minute, and the 13th second at the master timing mechanism located at the transmitter, the time, both a. m. and p. m., at which all types of correction are scheduled to occur. The transmitter causes a carrier signal of predetermined frequency to be applied to the line for a duration of 7 seconds, i. e., between the 13th and 20th seconds of the 56th minute. Such a signal is detected by a suitable receiver 30, set forth in the copending application. The signal causes the main armature 81 to be attracted toward the electromagnet 80 thereby clutching the rack 68 to the constantly rotating gear 69 of the clock train, with the result that the rack 65 begins to move upwardly. The signal is sustained, preferably for 7 seconds. After an initial lock-in interval (see 182 in Fig. 9), the pin 83 on the rack passes behind the rail 82 so that the rack is locked in its driving position. A spurious signal, as contrasted with the sustained signal used herein, would end before lock-in and would thus simply permit the armature and rack to fall back to an unclutched position and the rack would not cycle. However, with the rack locked in, the upward movement continues, with the gear 91 being rotated by the teeth 90 at the upper end of the rack (see Fig. 6). Rotation of the gear 91 produces rotation of the disc 97 connected thereto causing the pawl 93 on the disc to move around the periphery of the cam 94 which is coupled to the minute hand through gears 60, 54. When the pawl 93 drops into one of the notches 95, 96 formed on the cam 94, the cam and the connected minute hand are "picked up" and, upon continued movement of the rack, the minute hand is rotated forwardly to its reference position, the reference position being shown in Fig. 1.

During the time that the minute hand correction is taking place, a second signal is sent out over the line by the transmitter, specifically between the 40th and 52nd seconds, causing a second energization of the electromagnet 80. This pulls in the auxiliary armature 152 as shown in Fig. 6, the auxiliary armature being held in by the sustained nature of the signal. The upper end 152b of the armature engages the pin 175, and upon continued movement of the rack, the lost motion is taken up between the pin and the hole 176 in the hour correction lever; thus, the hour correction lever begins to rotate in the counterclockwise direction. This causes the finger 171 to swing outwardly into the position shown in Fig. 7b, freeing the ratchet disc 160 and engaging the pawl 162 with the ratchet wheel 157. It is to be noted that, by reason of the lost motion, a sustained signal acting for a length of time in excess of the delay interval illustrated at 183 in Fig. 9 is required to accomplish such release. A spurious signal will not have sufficient duration to effect movement of the lever 170 and will simply cause premature drop-out of the auxiliary armature.

Engagement of the pawl 162 with the ratchet wheel rotating at 1 R. P. M. causes the ratchet disc 160 and its pawl 163 to rotate at 1 R. P. M. in a clockwise direction, the pawl 163 riding on the surface of the cam 161 as shown in Fig. 7c. The scheduled release of the auxiliary armature at the 52nd second does not affect or stop the rotation of the ratchet disc since the upper end of the lever 170 is held in its left hand position by engagement with the periphery of the ratchet disc; thus one complete revolution of the correction mechanism is assured once such mechanism has been released. At some point in the path of movement of the pawl 163 (after about 300° in the present example), the pawl 163 falls into the notch 166 on the cam 161 as shown in Fig. 7d. This "picks up" the cam 161 attached to the hour hand 22 which then continues to rotate in a clockwise direction until such time as the upper end of the hour correction lever 171 drops into the notch 160a, the latter occurring in the present instance at the 6 o'clock position of the hour hand. The dropping of the correction lever into the notch causes the pawl 162 to be disengaged from the ratchet wheel 157 thus terminating the 12-hour correction cycle.

Returning to the minute hand correction cycle, the rack continues its upward movement until the pin 83 "clears" the upper end of the rail 82 thereby permitting the rack to swing back to the unclutched position under the urging of spring 86, following which it is drawn downwardly by gravity and by the spring 88. This restores the rack to its initial condition in readiness of a subsequent correction cycle.

In the above stop motion views Figs. 7a–7e, an "out of time" condition was assumed. In the case where no power interruption has occurred and where the hour hand is "on time" an idle movement of the pawl 163 occurs as set forth in Figs. 8a–8c. In Fig. 8a, it will be noted that at the beginning of the correction cycle the pawl 163 is adjacent the point of drop-off of notch 166. Consequently, when the pawl 163 is rotated clockwise during the correction signal, it will not engage the notch 166 until after substantially the full 360° of rotation. Since the pawl is limited to one revolution, there will be substantially no resulting movement of the hour hand.

It is one of the features of the present arrangement that it is free from the effects of spurious signals which may exist on the A. C. supply line, particularly in factories where heavy loads are constantly being turned on and off. This is especially important when it is considered that the corrector mechanism arbitrarily sets the hour hand to point to 6 o'clock. It is interesting at this point to note that the rack 65 and its driving mechanism, in addition to its various functions in effecting correction of the minute and second hands, is utilized both as an armature carrier for the auxiliary armature 152 and as a timer for causing the 12-hour correction mechanism to respond only to signals sent out from the master clock during a predetermined interval, an interval which follows the initial hourly correction signal by a predetermined delay interval. Thus two conditions must be met for the 12-hour corrector mechanism to function: The arrival of the rack at the beginning of the tripping portion of its movement, i. e., when the upper end of the auxiliary armature is in position to engage the pin 175, must occur at the same time that the armature is held in by a sustained signal received from the master clock. The rack or armature carrier can, for convenience, be said to "able" the armature to do its tripping function. Conversely, the armature can be said to "able" the carrier to perform its tripping function. If either condition is lacking the mechanism is thoroughly disabled.

It is a further feature that the 12-hour correction occupies only 12 seconds during the minute out of the hour during which the 12-hour correction takes place. A signal falling outside of this predetermined time interval will be completely ineffective to initiate the 12-hour correction cycle. Consequently, as will be apparent from Fig. 9, other remote devices controlled by carrier current at the control frequency may be operated during the "free time" without having any effect upon the present clock. Seated in other words, the present clock requires a minimum of the total available control time and puts a minimum demand upon the carrier control system.

From a practical point of view, it is important to note that all of the above has been accomplished by the addition of only a few elements to the existing mechanism disclosed in the earlier application and with little or no modification of the basic mechanism. Consequently, the cost of converting an hourly-corrected clock to include 12-hour correction has been minimized and the advantages far outweigh the cost of conversion. It will be equally apparent that the 12-hour correction feature may be easily and efficiently included during the production line manufacture of the clocks as either a standard or as an optional feature.

What is claimed is:

1. In a secondary clock energized from an A. C. supply line, the combination comprising a synchronous motor, hour and minute hands driven by said motor, means for positioning said minute hand at a predetermined reference position, means for positioning said hour hand at a predetermined reference position, an electromagnet, means for supplying electrical control impulses to said electromagnet, first and second movable armatures for cooperating therewith, an armature carrier for mounting said armatures and arranged for cyclical movement so that the first armature is opposite said electromagnet at the beginning of a cycle and said second armature is opposite said electromagnet at a predetermined later time in the cycle, means including a first single-cycle clutch driven by said motor and arranged for actuation by said first armature for driving said armature carrier and said minute hand positioning means through a single cycle of operation upon receipt of a first control impulse by said electromagnet, and means including a second single-cycle clutch driven by said motor and arranged for actuation by said second armature upon receipt of a second control impulse at said predetermined later time for driving said hour hand positioning means.

2. In a secondary clock energized from an A. C. supply line, the combination comprising a synchronous motor, hour and minute hands driven by said motor, means for positioning said minute hand at a predetermined reference position, means for positioning said hour hand at a predetermined reference position, means including first and second clutches for clutching said positioning means respectively to said motor, an electromagnet, first and second movable armatures for cooperating therewith, and an armature carrier for mounting said armatures and coupled to said motor for cyclical movement so that said armatures are presented in succession to said electromagnet upon movement of the carrier, said armatures being controllingly coupled to said clutches respectively so that the clutches are actuated by successive impulses received by said electromagnet timed with respect to the presence of said armatures at said electromagnet.

3. In a secondary clock energized from an A. C. supply line, the combination comprising a synchronous motor, hour and minute hands driven by said motor, means for positioning said minute hand at a predetermined reference position, means for positioning said hour hand at a predetermined reference position, means including first and second clutches for clutching said positioning means to said motor, an electromagnet, means for supplying impulses to said electromagnet, first and second movable armatures for cooperating therewith, and an armature carrier for mounting said armatures and coupled to said motor for cyclical movement so that said first armature is opposite said electromagnet at the beginning of a cycle and said second armature is opposite said electromagnet at a predetermined later time in the cycle, said armatures being controllingly coupled to said clutches respectively so that the first clutch is actuated by said electromagnet upon receipt of an impulse at the beginning of the cycle and so that said second clutch may be optionally operated by said electromagnet by an impulse received at a predetermined later point in said cycle timed with respect to the arrival of said second armature at said electromagnet.

4. In a secondary clock energized from an A. C. supply line, the combination comprising a synchronous motor, hour and minute hands normally driven by said motor, means for positioning said minute hand at a predetermined reference position, means for positioning said hour hand at a predetermined reference position, both of said positioning means being so arranged as to be capable of moving said hands notwithstanding the normal driving connections from said motor, first and second clutches for clutching said positioning means to said motor, an electromagnet, means for supplying control impulses thereto, first and second movable armatures cooperating with said electromagnet, and means coupled to said motor for successively conditioning said armatures for operation by said electromagnet, said slutches being arranged for actuation by said armatures respectively so that the first clutch is actuated by a first control impulse received at said electromagnet at the beginning of a cycle and so that said second clutch is actuated by a second impulse received at a predetermined later time in the cycle.

5. In a secondary clock energized from an A.-C. supply line, the combination comprising a synchronous motor, hour and minute hands driven by said motor, means for positioning said minute hand at a predetermined reference position, means for positioning said hour hand at a predetermined reference position, an electromagnet, a receiver responsive to carrier current on said line for operating said electromagnet, means responsive to a first actuation of said electromagnet for operating said minute hand positioning means, and means responsive to a successive actuation of said electromagnet occurring within a predetermined time following said first actuation for operating said hour hand positioning means.

6. In a secondary clock energized from an A.-C. supply line, the combination comprising a synchronous motor, hour and minute hands driven by said motor, means for positioning said minute hand at a predetermined reference position, means for positioning said hour hand at a predetermined reference position, an electromagnet, means for supplying control impulses to said electromagnet, means including an interval timing mechanism for abling said hour hand positioning means after passage of a predetermined time interval after the mechanism is started, means responsive to a first control impulse received by said electromagnet for operating said minute hand positioning means and for starting said interval timing mechanism, and means responsive to a subsequent control impulse received at said electromagnet and occurring after said predetermined time for operating said hour hand positioning means.

7. In a secondary clock energized from an A.-C. supply line, the combination comprising a synchronous motor, hour and minute hands driven by said motor, means for positioning said minute hand at a predetermined reference position, means for positioning said hour hand at a predetermined reference position, an electromagnet, means for supplying control impulse to said electromagnet, means including a cycle timing mechanism for abling said hour hand positioning means for a predetermined time interval during its cycle and for disabling said hour hand positioning means during the other portions of the cycle, means responsive to a first control impulse received by said electromagnet for operating said minute hand positioning means and for starting said cycle timing mechanism, and means responsive to a subsequent control impulse received at said electromagnet and occurring during said predetermined time interval for operating said hour hand positioning means.

8. In a secondary clock energized from an A.-C. supply line, the combination comprising a synchronous motor, hour and minute hands driven by said motor, means for positioning said minute hand at a predetermined reference position, means for positioning said hour hand at a predetermined reference position, an electromagnet, means for supplying control impulses to said electromagnet, means including a cycle timing mechanism so arranged as to be capable of operating said hour hand positioning means for a predetermined interval during cycle and incapable of operating said hour hand positioning means during other portions of the cycle, means responsive to a first control impulse received by said electromagnet for operating said minute hand positioning means and for starting said cycle timing mechanism, and means responsive to a subsequent control impulse received at said electromagnet and sustained for a period of several seconds during said predetermined time interval for operating said hour hand positioning means.

9. In a secondary clock energized from an A.-C. supply line, the combination comprising a synchronous motor, hour and minute hands driven by said motor, means for positioning said minute hand at a predetermined reference position, means for positioning said hour hand at a predetermined reference position, means including an electromagnet having provision for supplying control impulses thereto from a remote location, a movable member mounted for cycling movement, means including a first clutch operated by said electromagnet, means for connecting the movable member to said motor and so arranged that said movable member begins a cycle of movement when a first control impulse is received, means responsive to the movement of said movable member for operating the minute hand positioning means, an armature on said movable member and arranged for presentation to said electromagnet at a predetermined time during its cycle, means including a single cycle clutch for connecting the hour hand positioning means to the motor, and means for coupling said armature to said second clutch so that said clutch is actuated upon receipt of a second control impulse by said electromagnet timed to correspond to the arrival of said armature at said electromagnet.

10. In a secondary clock energized from an A.-C. supply line, the combination comprising a synchronous motor, hour and minute hands driven by said motor, an electromagnet having provision for supplying control impulses thereto from a remote point, means including a rack member so arranged that upon energization of said electromagnet said rack member is clutched to said synchronous motor for a reciprocated cycle of movement, means responsive to the reciprocated movement of the rack for causing the minute hand to be positioned at a predetermined reference position, means for positioning the said hour hand at a predetermined reference position, and means actuated by said electromagnet for initiating operation of said hour hand positioning means upon said rack reaching a predetermined position in its path of movement so that said hour hand positioning means may be triggered for operation by receipt of a control impulse occurring at a predetermined time following the beginning of the cycle of movement of the rack member.

11. In a secondary clock energized from an A.-C. supply line, the combination comprising a synchronous motor, hour and minute hands driven by said motor, an electromagnet having provision for receiving control impulses from a remote point, means including a rack member so arranged that upon receipt of a first impulse by said electromagnet said rack member is clutched to said synchronous motor for a reciprocated cycle of movement, means responsive to the reciprocated movement of the rack for causing the minute hand to be positioned at a predetermined reference position, means including a single revolution clutch coupled to said motor for positioning the hour hand at a predetermined reference position, a movable armature on said rack member so arranged as to be out of the influence of said electromagnet during the initial movement thereof but operable by said electromagnet thereafter, and means including an actuating linkage for said single revolution clutch so arranged as to be moved as said rack member reaches a predetermined position in its path of movement concurrently with said armature being in its attached position.

12. In a secondary clock energized from an A.-C. supply line, the combination comprising a synchronous motor, hour and minute hands driven by said motor, an electromagnet having provision for receiving control impulses from a remote control station, a movable member so constructed and arranged that upon initial energization of said electromagnet said member is clutched to said synchronous motor for a cycle of movement, means responsive to the movement of the movable member for causing the minute hand to be positioned at a predetermined reference position, means for positioning the hour hand at a predetermined reference position, a pivoted armature on said movable member arranged for movement into an active position upon receipt of a subsequent sustained impulse by said electromagnet, and trip means associated with said hour hand positioning means and engageable by said armature when the latter is in active position for operating said hour hand positioning means incident to the continued movement of said movable member.

13. In a secondary clock energized from an A.-C. supply line, the combination comprising a synchronous motor, hour and minute hands driven by said motor, an electromagnet having provision for receiving control impulses from a remote control station, a movable member so constructed and arranged that upon receipt of an initial impulse by said electromagnet said member is clutched to said synchronous motor for a cycle of movement, means responsive to the movement of the movable member for causing the minute hand to be positioned at a predetermined reference position, means including a single-cycle clutch for positioning the hour hand at a predetermined reference position, an armature on said movable member arranged for movement into an active position upon receipt of a subsequent impulse by said electromagnet, and trip means controllingly coupled to said single cycle clutch and engageable by said armature when the latter is in active position for initiating a cycle of clutch operation, said trip means including a lost motion connection so that a sustained impulse is required to trip said clutch and so that the trip mechanism is nonresponsive to spurious impulses.

14. An hour hand resetting mechanism for a secondary clock of the type having a synchronous motor, minute and hour hands driven by the motor, an electromagnet energized by primary clock signals of predetermined duration occurring at selected reference points in chronological time, an hour hand positioning member movable from a normally retracted position to a limit position in a predetermined time by the clock motor upon initiation of the movement by the application of hourly resetting signals, means for coupling said positioning member to the minute hand for advancing the minute hand to a predetermined reference position corresponding in chronological time to the attainment of the limit position of the position member, which hour hand resetting mechanism comprises an hour hand resetting drive coupled to the hour hand through a timed clutch, a latch member actuated to engage the clutch for the timed period, a shiftable stop member positioned on said minute hand positioning means alined to engage the latch member and displace it in the active position upon movement of the positioning member past a given intermediate point in its displacement, an armature adapted to be attracted by the energizing of said magnet as the positioning member approaches said intermediate point whereby said movable stop is shifted to the active position, and means for supplying certain of said signals during selected ones of said hourly resetting cycles whereby the timed displacement of the minute hand positioning means is effective to cause the positioning of the hour hand to a reference position a predetermined time interval after actuation of the auxiliary armature.

No references cited.